P. DANCKWARDT.
PROCESS FOR THE PRODUCTION OF HYDROCARBONS OF LOW BOILING POINTS FROM HYDROCARBONS OF HIGH BOILING POINTS.
APPLICATION FILED AUG. 27, 1917.
1,373,654. Patented Apr. 5, 1921.
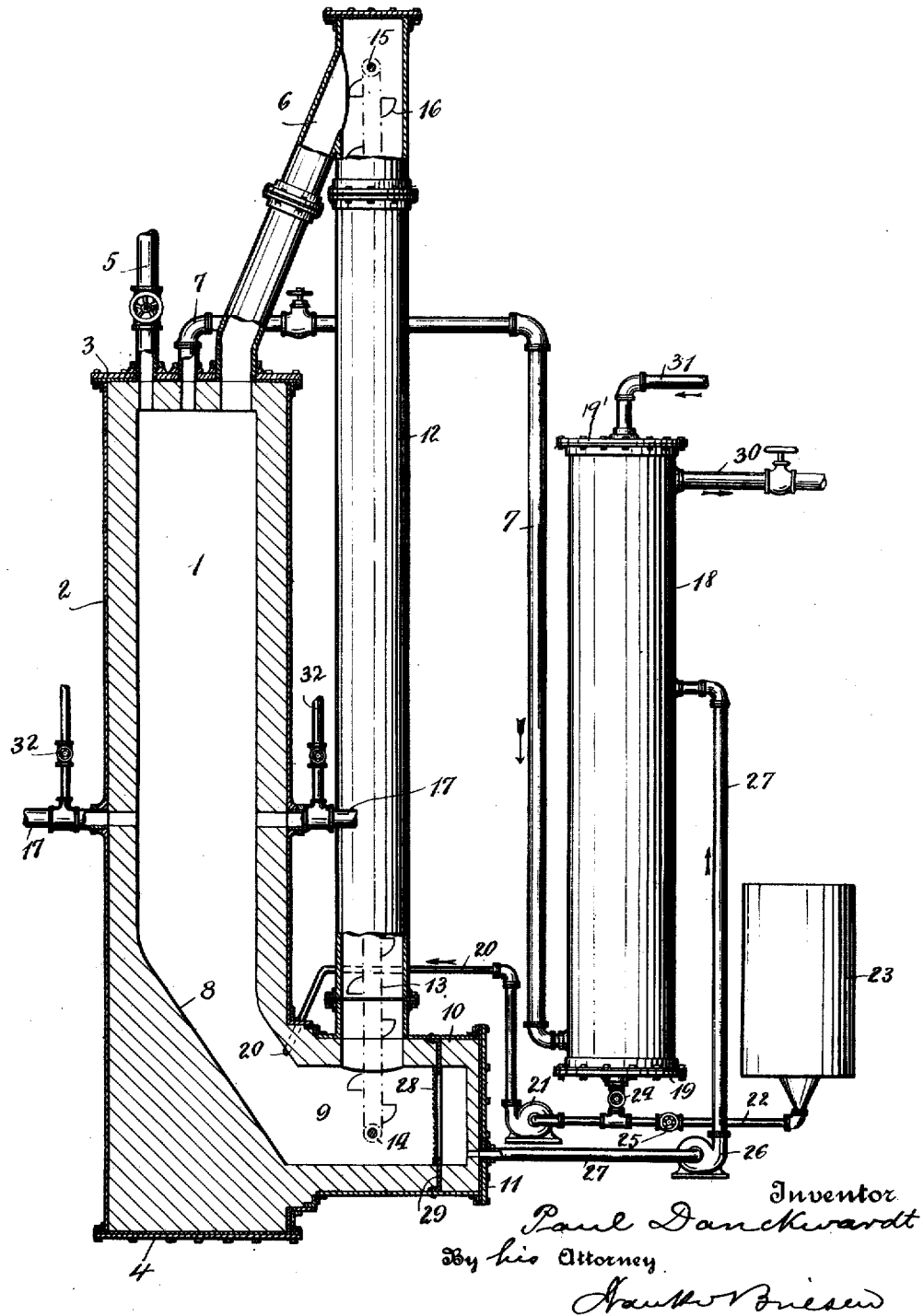
Inventor
Paul Danckwardt
By his Attorney

UNITED STATES PATENT OFFICE.

PAUL DANCKWARDT, OF DENVER, COLORADO.

PROCESS FOR THE PRODUCTION OF HYDROCARBONS OF LOW BOILING-POINTS FROM HYDROCARBONS OF HIGH BOILING-POINTS.

1,373,654.   Specification of Letters Patent.   Patented Apr. 5, 1921.

Application filed August 27, 1917. Serial No. 188,307.

*To all whom it may concern:*

Be it known that I, PAUL DANCKWARDT, a citizen of the United States, and a resident of Denver, in the county of Denver and State of Colorado, have invented certain new and useful Improvements in Processes for the Production of Hydrocarbons of Low Boiling-Points from Hydrocarbons of High Boiling-Points, of which the following is a specification.

This invention relates to a process of changing the character of oils, such as crude, petroleum, petroleum products, tar and similar oils, with a view of obtaining more oils of relatively low boiling points from them than it is possible by present methods. It also comprises a method of improving the character of the oils thus obtained in so far as to produce only, or nearly so, saturated hydrocarbons which can be sold directly to the consumer without subjecting them to further refining processes. More particularly stated, it comprises a process in which, in the presence of nickel in a finely divided state and a chlorid of nickel or another metal and a large percentage of carbon, as contact substances, the oil and aqueous fluid (that is to say, water or steam) are subjected to a heating process, thereby causing the oil to distil and combine with the hydrogen of the aqueous fluid and the hydrogen of hydrochloric acid formed during the process.

It has long been known that nickel alone has the property under certain conditions, when steam and oil are passed over it, of causing the steam to split off its hydrogen and transfer this hydrogen to the oil, in other words, to cause addition of hydrogen to the oil and render the oil lighter and more volatile. Soon, however, it was discovered that the nickel when used for some time, would lose this property, mainly on account of sulfur and other impurities contained in the oil combining with it. The process, therefore, has never come to be established on a commercial scale.

The object of the present invention is to prevent such deterioration of the qualities of the nickel and I obtain the desired result by adding a haloid of a metal, which under the conditions existing during the process will alternately become decomposed and re-formed. On account of their cheapness I prefer to use chlorids, and preferably nickel chlorids and nickel as the metal, though other chlorids will do as well, but not other metals. Instead of metallic nickel, I may employ nickel oxid or nickel carbonate. The nickel is continually regenerated during the process by passing alternately into the form of nickel chlorid and becoming again reduced to the metallic state, while the impurities taken up by it while it served as contact substance are driven out as volatile compounds. The other component of the chlorid, viz., chlorin, combines with the hydrogen of any aqueous fluid present, and the so formed hydrochloric acid again produces chlorids. This result is due to the decomposition occurring according to the formula, $$C + H_2O = CO + H_2,$$

by the action of the incandescent carbon of the charge on the aqueous fluid, the hydrogen thus liberated, combining with the chlorin of the chlorids to form hydrochloric acid and metallic nickel. Such a process is similar to that described in my other specification of equal date, Serial No. 188,305, but differs in so far as here the hydrogen of any aqueous fluid present within the charge during its treatment takes part directly in the formation process of light hydrocarbons by adding itself directly under the catalyzing influence of metallic nickel to the heavier oils, as will be set forth more fully hereinafter. Only the reaction between the hydrochloric acid and any excess metal present is identical with the reaction made use of in my other application. In this process, not so much care need be taken to limit the supply of oxygen or air, and all the heating may take place by the combustion of carbon (chiefly the coke of the charge) with admission or injection (blast) of air to support combustion. Instead of air, air enriched in oxygen or commercial oxygen may be employed. If air is used, the process becomes very cheap. I have employed pressures up to 150 lbs. per square inch, but that is not absolutely necessary. It accelerates the reaction, however, considerably.

Having briefly outlined my improved process, I will proceed to describe the same in detail, and in so doing will explain a suitable apparatus for carrying out the same, reference being had to the accompanying drawing which represents a vertical cross section.

In this drawing, numeral 1 represents the still proper, formed by a vertical steel cylinder 2—2, closed at the top and bottom by steel plates 3 and 4, of which the top plate 3 is provided with pipe connections 5, 6 and 7 and proper valves. The still is lined with a suitable refractory material 8, the hollow space left slanting gradually toward the compartment 9, which consists of a horizontal cylinder 10 made of steel and also lined inside and closed at one end by a steel plate 11. The lower compartment 9 is connected with a pipe 6 leading into the top of the still by means of an elevator shaft 12 containing elevator 13, running on pulleys and shafts 14 and 15, through which it is put into operation from an outside source of power. The shell 12 is made of steel, and so is the elevator a simple steel chain moving on sprocket wheels and carrying perforated steel buckets 16. Two or more twyers 17 convey air under any amount of pressure into the interior of the still. They have small branch pipes with valves 32 to supply aqueous fluid (say) steam. Pipe 7 rising from the top of the still serves for the purpose of conveying the gases and vapors from the still to the container 18 consisting of a high steel cylinder closed at the bottom and top by plates 19 and 19′ respectively. Another pipe 20 and pump 21 connect the bottom of the oil container 18 with the interior of compartment 9. A branch pipe 22 leads to a receptacle 23 and both pipes 20 and 22 are provided with valves 24 and 25 so that a supply may be drawn from either receptacle 23 or container 18. Another pump 26 and pipe 27 establish means for passing fluid from compartment 9 to the container 18. A screen 28 fastened to an angle ring 29—29 allows only the oil and the finer part of the charge to pass through pipe 27. The container 18 is provided with outlet 30 for the vapors and gases formed, leading them to a condenser (not shown) and with a pipe 31 serving for the supply of fresh oil.

At present the preferred form of apparatus, of a capacity of about 3,000 gallons of oil per twenty-four hours when continuously operated, has the following dimensions: The still compartment 1 has a diameter of 3½ feet and a height of 13 feet. The elevator pipe 12, in which the elevator 13 operates, is 15 inches in diameter and the container 18 is 15 feet high by 2 feet in diameter.

In order to operate my process in the above described apparatus, I first fill the still 1 through the pipe 5 with the charge up to the level of the twyer 17. This charge is composed of 80–85% carbon in the shape of a clean coke crushed to about the size of a nut, (which coke always contains some moisture,) 5–10% of nickel or nickel oxid, and 5–10% of one or more chlorids, preferably nickel chlorid. On top of this charge at the level of 17, I now place a small amount of wood shavings and ignite them through one of the twyers. If valve 5 is open, enough draft is produced to set the wood afire. I now drop some charcoal through 5 upon the burning wood and when this is well ablaze, I pass air, or oxygen, or air enriched in oxygen, through 17 and through the charge, first under a light pressure, while filling gradually the still full of charge. I then close the valve of pipe 5 and raise the air pressure gradually, starting at the same time the elevator and the two pumps with valve 24 open and valve 25 closed, the container having been filled previously with oil up to the middle. The effect of the blast on the combustion of the carbon (chiefly coke) is soon visible in the heating of the oil in the container 18, and the process is rapidly brought up to full action. At the twyer level, where the greatest heat exists, the nickel or other chlorid is decomposed according to the reaction expressed by the formula:

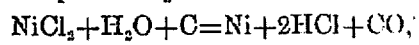
$$NiCl_2 + H_2O + C = Ni + 2HCl + CO,$$

either through moisture in the charge or through aqueous fluid (say steam) admitted expressly for that purpose through pipes 32. Of course if this aqueous fluid is injected as water, it is almost immediately converted into steam. The hydrochloric acid thus liberated, together with excess steam and fixed gases are mostly forced upward and meet the mixture of carbon and nickel and oil which is continually transported upward by the elevator from compartment 9, where a jet of oil plays on the charge coming down the shaft of the still. Thus the hydrochloric acid and steam react on the oil coming from above, through the intermediary of the nickel contained in the charge according to the general equations

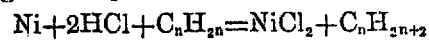
$$Ni + 2HCl + C_nH_{2n} = NiCl_2 + C_nH_{2n+2}$$

and

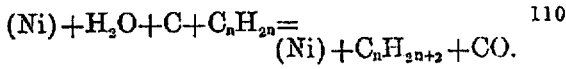
$$(Ni) + H_2O + C + C_nH_{2n} = (Ni) + C_nH_{2n+2} + CO.$$

The oxygen probably reacts with carbon of the charge or carbon of the oil forming carbon monoxid. It may also be that part of the $H_2O$ is already decomposed at a lower level with the formation of CO and $H_2$ and the hydrogen resulting from this decomposition (according to the equation

$$C + H_2O = CO + H_2)$$

just adds itself under the catalyzing effect of the nickel to the heavier oils. It can only be stated with certainty, that the necessary hydrogen is contributed by the aqueous fluid to a large extent as the amount of water caught in the condenser is much smaller than that introduced into the still. We have in this way considerable hydrogenation taking place in the upper part of the still, and as the heavier part of the oil is liable to proceed farther down the shaft, it will be more energetically acted upon than that part of the oil which distills off already near the surface of the charge, where the gases are more diluted in active matter. The hydrogenation, which forms an important feature of this process, is brought about by two factors: first, by purely chemical action exerted by the hydrogen liberated from hydrochloric acid, and second, by the catalytic action of nickel.

But the upper half of the still is not the only place where this hydrogenation process is going on. The charge sinking below the twyer level is all the time enriching itself in metallic Ni derived from the continued decomposition of the chlorid, and when it reaches the outlet near 9, it is sprayed with oil coming from container 18. Here then, the same action occurs as on top though the catalytic reaction between nickel, steam carbon and oil probably prevails over the purely chemical reaction between nickel, hydrochloric acid and oil. The vapors and gases here formed escape through the elevator and down pipe 6 and are conveyed together with the top gases and vapors into the bottom of container 18. The pressure from the blower (not shown) connected with the twyers 17 forces the mixture through the oil of the container. If not all the hydrochloric acid has been absorbed before it reaches the container 18, it will here meet fresh fine charge coming through pipe 27 from the compartment 9. The purely chemical (substitution) reaction between hydrochloric acid, nickel and oil will, therefore, go on here to a considerable extent, but the catalytic reaction between nickel, steam carbon and oil undoubtedly will be weaker, unless the container is put under pressure by providing pipe 30 with a valve. I have found that the catalytic reaction mentioned above is accelerated by an increase of pressure, but the substitution reaction between hydrocloric acid, nickel, and oil does not appear to be affected by pressure. In the preceding operation I have, however, only had in mind to work the still proper under pressure, which is done by closing the valve in line 7 partly, until a pressure gage (not shown) placed in the line or on top of the still indicates the proper degree. This pressure may vary between 50 and 100 lbs. per square inch. Working under such pressures, the temperature of the oil in the bottom of the still will be between 300 and 225° C. and that of the oil in the bottom of the container 18 about 200° C., while the temperature of the vapors in the upper part of the container 18 gradually falls to nearly 150° C. I operate the blower all the time at such a speed as to maintain at the escape pipe 30 a temperature near 150° C. If this rule is observed, nothing but the lightest hydrocarbons distil over, those of higher boiling points condensing in the upper part of the container 18. Pump 21 will then return them to the system mixed with fresh oil flowing in through pipe 31.

In working this process with compressed air a considerable part of the coke in the charge will be burnt off forming carbon monoxid. This would gradually decrease the amount of charge contained in the still in spite of some carbon being formed continually by the oil coming in contact with very hot particles of charge, particularly at the lower end of the shaft. While this should be avoided, it cannot be avoided altogether, but the carbon thus formed benefits the process in so far as it replenishes part at least of the burnt carbon. To keep the total amount of charge contained in the apparatus and the proportion of carbon, in the charge as nearly constant as possible, I run in through pump 21, whenever required, a mixture of oil and finely crushed carbon from receptacle 23 by opening valve 25 and closing temporarily valve 24. This ought to be done at regular intervals to conform with the rate of consumption of carbon of the charge.

As this process generates a large amount of fixed gases by burning part of the carbon to monoxid, the process requires a comparatively large condenser. Even then it would be advisable to place behind the condenser a scrubber containing cold crude oil and force all the fixed gases coming from the condenser through this oil, which will absorb the remaining gasolene and deliver gas practically free of gasolene. The crude oil enriched in hydrocarbons of relatively low boiling points is then fed into the container 18 instead of original crude oil, and the gasolene is thus recovered together with that of the process proper. Of course, another way of avoiding losses in gasolene, or cutting them down to the least possible amount would be, as mentioned above, by substituting for air, oxygen or air enriched in oxygen. This would reduce the bulk of fixed gases very much. At the same time, a waste gas containing no or little nitrogen, would be obtained, which has much greater value.

The amount of pressure to be used to conduct the process need in no case exceed 150 lbs. per square inch. I wish to emphasize, however, that it is not absolutely necessary to employ pressure at all, more than necessary to overcome the resistance to the passage of the gases and vapors through the whole system, though there exists no doubt, that pressure is of material assistance in accelerating the reaction.

While in the appended claims I have referred to nickel, I desire it to be understood that this term is intended to cover the equivalents named in the specification, and similarly, where I refer to nickel chlorid in the claims, other chlorids are to be considered as equivalents covered by such claims.

I claim:

1. The process of producing hydrocarbons of relatively low boiling points from hydrocarbons of relatively high boiling points, which consists in igniting a charge composed of a haloid salt, nickel, and a large percentage of carbon, keeping up combustion within the charge by the introduction of a blast containing oxygen, passing simultaneously oil and aqueous fluid through the charge, and condensing the hydrocarbons of relatively low boiling points separately from those of higher boiling points.

2. The process of producing hydrocarbons of relatively low boiling points from hydrocarbons of relatively high boiling points, which consists in mixing a large percentage of carbon with a small percentage of nickel chlorid and nickel, igniting the mixture and blowing air and steam through it, bringing those parts of the charge or mixture from the point of greatest heat to a point of less heat where it is brought in contact with oil to be treated, distilling off the oil under the influence of the contact substances and chemicals of the charge, and condensing the hydrocarbons of relatively low boiling points separately from those of higher boiling points.

3. The process of producing hydrocarbons of relatively low boiling points from hydrocarbons of relatively high boiling points, which consists in igniting a mixture of carbon, nickel and nickel chlorid, passing air and steam through the mixture to maintain combustion, adding oil to the mixture, allowing it to distil off, passing it through another body of oil and mixture of the above ingredients, and condensing that part of the oils which boils at or below 150° C. separately from the portion boiling at a temperature above said point.

4. The process of producing hydrocarbons of relatively low boiling points from hydrocarbons of relatively high boiling points, which consists in igniting a charge consisting of carbon, a chlorid of metal and nickel, maintaining combustion by means of an air blast having an admixture of steam, withdrawing continually part of the charge below the point of entrance of the blast, mixing it with part of the oil to be treated, conveying this new mixture continually to the top of the charge, from which point it is allowed to gradually descend to and past the point of entrance of the blast, mixing it again with fresh oil and repeating the operation, all the time allowing the oil vapors formed to pass through another body of oil and charge, and condensing the hydrocarbons of a relatively low boiling point separately from those of a higher boiling point.

5. The process of producing hydrocarbons or relatively low boiling points from hydrocarbons of relatively high boiling points, which consists in alternately decomposing and reforming metal chlorid which is mixed with carbon and nickel, in the presence of steam and by passing the mixture alternately through zones of a high and a moderate temperature, simultaneously bringing oil to be treated in contact with the mixture in the area of moderate temperature, allowing the vapors formed by catalysis and through chemical reactions to escape to a proper condensing arrangement, where the hydrocarbons of relatively low boiling points may be recovered separately from those of a higher boiling point.

6. The process of producing gasolene from crude oil or similar products, which consists in passing air and steam through a burning mass of carbon, metal chlorid and metal, thereby decomposing at the point of highest temperature the chlorid into its components, causing the chlorin to combine with hydrogen from the steam, forcing the gases to come in contact with portions of the charge less heated, where conditions for the reformation of the chlorid are favorable, introducing oil to be treated at such portions of the charge, thereby causing hydrogenation of the oil to take place, passing the altered oil vapors through another body of oil containing more charge, and recovering the oils of relatively low boiling points separately from those of higher boiling points.

7. The process of producing hydrocarbons of relatively low boiling points from hydrocarbons of relatively high boiling points, which consists in igniting a charge composed of a chlorid, nickel, and a large percentage of carbon, and supporting its combustion with the aid of a blast containing oxygen, causing hydrogen *in statu nascendi* to reduce the chlorid, thus forming hydrochloric acid and metal, allowing the hydrochloric acid thus obtained, to react with said metal at a different portion of the material under treatment, thus producing hydrogen, passing simultaneously oil and an aqueous fluid through the charge, and condensing the hydrocarbons of relatively low boiling points separately from those of higher boiling points.

PAUL DANCKWARDT.